(12) United States Patent
Miller et al.

(10) Patent No.: US 7,395,277 B2
(45) Date of Patent: *Jul. 1, 2008

(54) CONTENT FRAMEWORK METHOD

(75) Inventors: Grant D. Miller, Superior, CO (US); Joan L. Mitchell, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 330 days.

This patent is subject to a terminal disclaimer.

(21) Appl. No.: 11/043,849

(22) Filed: Jan. 25, 2005

(65) Prior Publication Data

US 2006/0167890 A1    Jul. 27, 2006

(51) Int. Cl.
*G06F 17/30* (2006.01)
*G06F 7/00* (2006.01)

(52) U.S. Cl. .............. 707/104.1; 707/102; 707/101; 707/10

(58) Field of Classification Search ............ 707/104.1, 707/102, 10, 101
See application file for complete search history.

(56) References Cited

U.S. PATENT DOCUMENTS

| | | | |
|---|---|---|---|
| 6,615,252 B1 | 9/2003 | Oka et al. | |
| 6,671,695 B2 * | 12/2003 | McFadden | 707/102 |
| 6,763,370 B1 * | 7/2004 | Schmeidler et al. | 709/203 |
| 7,181,523 B2 * | 2/2007 | Sim | 709/226 |
| 7,219,143 B1 * | 5/2007 | Skelly | 709/223 |
| 2001/0014975 A1 * | 8/2001 | Gordon et al. | 725/91 |
| 2002/0026445 A1 * | 2/2002 | Chica et al. | 707/100 |
| 2002/0052849 A1 * | 5/2002 | McCutchen et al. | 705/59 |
| 2002/0059621 A1 * | 5/2002 | Thomas et al. | 725/87 |
| 2002/0072952 A1 * | 6/2002 | Hamzy et al. | 705/10 |
| 2002/0143791 A1 * | 10/2002 | Levanon et al. | 707/200 |
| 2003/0046239 A1 | 3/2003 | Geilfuss et al. | |
| 2003/0093544 A1 | 5/2003 | Richardson | |
| 2004/0034651 A1 * | 2/2004 | Gupta et al. | 707/102 |
| 2004/0039754 A1 * | 2/2004 | Harple Jr. | 707/104.1 |
| 2004/0111473 A1 | 6/2004 | Lysenko et al. | |
| 2005/0216524 A1 * | 9/2005 | Gomes et al. | 707/201 |

OTHER PUBLICATIONS

Content Distribution Networks, State of the art, Telematica Instituut, Jun. 1, 2001.*
L. Weitzman et al.: "Transforming the Content Management Process at ibm.com", Conference on Human Factors in Computing Systems, Apr. 20, 2002, Minneapolis, MN, XP-002392306, pp. 1-15.
K.H.S. Kwok et al., "A Web Services Implementation Framework for Financial Enterprise Content Management", System Sciences, 2004, Proceedings of the 37th Hawaii International Conference on Jan. 5-8, 2004, Picataway, NJ, USA, IEEE, Jan. 5, 2004, XP-010683388, ISBN-0-7965-2056-1, pp. 1-10.

(Continued)

*Primary Examiner*—Kuen S. Lu
(74) *Attorney, Agent, or Firm*—Schmeiser, Olsen & Watts; John R. Pivnichny

(57) ABSTRACT

A content framework method. The content framework method comprises providing a content infrastructure, a content flow management system, and a content association system. The content infrastructure comprises content management systems. Each of the content management systems comprises content. The content flow management system controls a flow of each of the content from each of the content management systems. The flow of content is controlled within and between each of the content management systems. The content association system creates a registry comprising associations metadata. The associations metadata links each of the content management systems together.

6 Claims, 4 Drawing Sheets

OTHER PUBLICATIONS

D. Hausheer et al.: "Design of a Distributed P2P-based Content Management Middleware" Euromicro Conference, 2003. Sep. 1-6, 2003, Piscataway, NJ, USA, IEEE, Sep. 1, 2003, XP-010657599, 8 pages.

C.D. Cranor et al.: "Design and Implementation of a Distributed Content Management System", International Workshop on Network and Operating System Support for Digital Audio and Video (NOSSDAV), Jun. 1-3, 2003, Monterey, CA, XP-002392307, 8 pages.

J. Ziegler et al.: "Visualizing and Exploring Large Networked Information Spaces with Matrix Browser", IV 2002, Proceedings of the Sixth International Conference on Information Visualisation, IEEE, Jul. 10-12, 2002, London, England, UK, pp. 361-366, XP-002405637.

M. Freire et al.: "A graph-based interface to complex hypermedia structure visualization", Advanced Visual Interfaces 2004, ACM Int. Work. Conf., May 25-28, 2004, Gallipoli, Italy, pp. 163-166, XP-00240.

Mao Lin Huang: "Graph Visualization of Web Data with Domain-Specific Attributes", Parallel and Distributed Processing Symposium., Proceedings International, IPDPS 2002, Ft. Lauderdale, FL, Apr. 15-19, 2002, Los Alamitos, CA, USA, IEEE Computer Society, US, Apr. 15, 2002, XP-010591287, ISBN: 0-7695-1573-8, pp. 1-7.

S. Mukherjea et al. Association for Computer Machinery: "Visualizing Complex Hypermedia Networks through Multiple Hierarchical Views", Human Factors in Computing Systems, CHI '95 Conference Proceedings, Denver, May 7-11, 1995, Conference on Human Factors in Computing Systems, New York, ACM, US, May 7, 1995, pp. 331-337, XP-000538463, ISBN: 0-201-84705-1.

* cited by examiner

CONTENT FRAMEWORK METHOD

BACKGROUND OF THE INVENTION

1. Technical Field

The present invention relates to a system and associated method for associating content within a content framework system.

2. Related Art

Randomly searching for data within a system may be difficult and very time consuming. Therefore there is a need to provide an easy and specific way to search for data within a system.

SUMMARY OF THE INVENTION

The present invention provides a content framework system, comprising:

a content infrastructure comprising content management systems, wherein each of said content management systems comprises content;

a content flow management system for controlling a flow of each of said content from each of said content management systems, wherein said flow is controlled within and between each of said content management systems; and a content association system for creating a registry comprising associations metadata, wherein said associations metadata links said content management systems together.

The present invention provides a method, comprising:

providing a content framework system comprising a content infrastructure, a content flow management system, and a content association system, wherein the content infrastructure comprises content management systems, and wherein each of said content management systems comprises content;

controlling by said content flow management system, a flow of each of said content from each of said content management systems within said content infrastructure system, wherein said flow is controlled within and between each of said content management systems;

creating within said content association system, a registry comprising associations metadata; and linking by said associations metadata, each of said content management systems together.

The present invention provides process for integrating computing infrastructure, comprising integrating computer-readable code into a computing system, wherein the code in combination with the computing system comprises a content framework system comprising a content infrastructure, a content flow management system, and a content association system, wherein the content infrastructure system comprises content management systems, wherein each of said content management systems comprises content; and wherein the code in combination with the computing system is adapted to impalement a method for performing the steps of:

controlling by said content flow management system, a flow of each of said content from each of said content management systems, wherein said flow is controlled within and between each of said content management systems;

creating within said content association system, a registry comprising associations metadata; and linking by said associations metadata, each of said content management systems together.

The present invention provides a computer program product, comprising a computer usable medium having a computer readable program code embodied therein, said computer readable program code comprising an algorithm adapted to implement a method for linking content management systems within a content infrastructure, said content management systems each comprising content, said method comprising the steps of:

controlling by a content flow management system, a flow of content from each of said content management systems, wherein said flow is controlled within and between each of said content management systems;

creating within a content association system, a registry comprising associations metadata; and linking by said associations metadata, each of said content management systems together.

The present invention advantageously provides a system and associated method to provide an easy and specific way to search for data within a system.

DETAILED DESCRIPTION OF THE INVENTION

Figure 1:
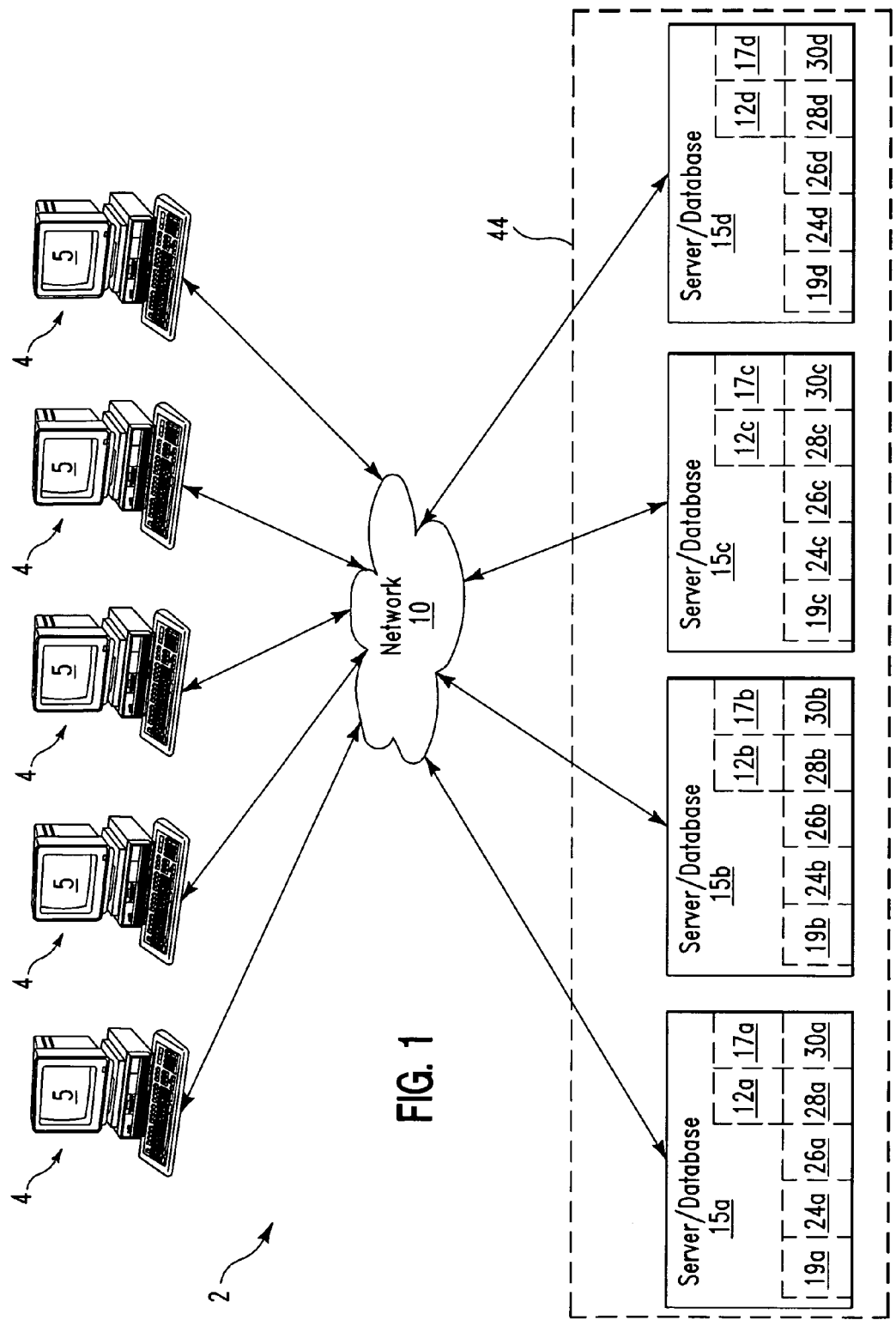
FIG. 1 illustrates a block diagram view of a computer system comprising a content framework system, in accordance with embodiments of the present invention.

FIG. 1 illustrates a block diagram view of a computer system 2 comprising a content framework system 44, in accordance with embodiments of the present invention. In an organization (or organizations) comprising multiple teams located across many geographies, it is common to have several teams within the organization solving similar problems concurrently. A challenge for the organization is to provide a process to allow each of the teams to create solutions for problems within the organization and share the solutions with others within the organization. Therefore, others within the organization may take advantage of the solutions while adding their own value to the solutions. Sharing solutions within the organization may be accomplished if each of the teams has an awareness of other teams and an ability to interact with each other. Alternatively, the organization may comprise a plurality of enterprises (e.g., companies, business partners, customers, or any combination thereof, etc.). Teams may comprise inter alia, technical teams (e.g., software developers, hardware developers, architects, etc.), business process teams (e.g., value chains, supply chains, manufacturing lines, etc.), marketing teams (e.g., web marketing, publications, etc), management teams (e.g., finance, product management, resource management, etc.), etc. Typically, there are several locations within a computer system/network where the teams may look for different types of information. The information (e.g., content) may be specific to, inter alia, disclosed intellectual property, technical solutions that are part of a product or project, business information, etc. The content framework system 44 comprises a plurality of server/databases 15$a$ ... 15$d$. Each of the server/databases 15$a$ ... 15$d$ comprises content management systems 12$a$ ... 12$d$ for managing content within each of server/databases 15$a$ ... 15$d$. The content framework system 44 additionally comprises content association tools 17a . . . 17d used for linking together and providing associations for the information (i.e., content within content management system 12a . . . 12d) so that the individual teams within the organization may locate associated content within the content management systems 12a . . . 12d to collaborate with each other to provide solutions to problems existing within the content.

The computer system 2 comprises a plurality of terminals 4, a plurality of display apparatuses 5, a computer network 10, and the content framework system 44. The content framework system 44 comprises a plurality of server/databases 15a . . . 15d. The plurality of terminals 4 are electrically connected through the computer network 10 to the server/databases 15a . . . 15d. The computer network 10 may be any computer network known to a person of ordinary skill in the art including, inter alia, the Internet, an intranet, a local area network (LAN), a wide area network (WAN), etc. The plurality of server/databases 15a . . . 15d each comprise a content management system 12a . . . 12d (i.e., content infrastructure 12 in FIG. 2), content flow management tools 19a . . . 19d, content association tools 17a . . . 17d, content manipulation tools 26a . . . 26d, joint development tools 24a . . . 24d, community tools 28a . . . 28d, and access and security tools 30a . . . 30d. Each of content systems 12a . . . 12d comprises content. Content may comprise any content that may be shared within an organization. For example, content may comprise, inter alia, data, software applications, shared software routines used by a plurality of software applications, software code developed by a plurality of users, etc. Each of the content management systems 12a . . . 12d may comprise any type of content management systems including, inter alia, a distribution system, a management system, a remote services system, a shared source system, etc.

Content within a distribution system comprises software and/or operating systems. A distribution system is used when technical teams within an organization submit content for products (e.g. publications, software and operating systems) into a distribution center to send to customers and employees of the organization. Metadata regarding the content is collected by the distribution system so that each of the objects (e.g. publications, software and operating systems) may be associated with each of the other products within the distribution system. Collection of the metadata also aides in a discovery process to locate of any of the products within the distribution system. The distribution system is a centralized control system that coordinates all the submitted content. The distribution system may comprise a relational database, such as, inter alia, DB2, AIX, Linux, etc., and/or an operating system's file system. The content within the distribution system, such as, inter alia, executable files, components such as shared libraries, or installable files for programs (i.e., a set of code that can execute a software product) are stored in the DB2 or file system so that a user or another program can gain access to them.

Content within a management system comprises data. The management system is used for creating, controlling, and disseminating the data. The management system may be used to deliver data to a website. The data may comprise, inter alia, data from web HTML pages, data from word processing files, data from XML documents, data from PDF files, etc. The management system is used to group related documents and/or a specific content file together to allow users to locate and read the documents. The management system may provide information about projects, processes, products, services, etc. Often times a management system is used manage web documents with a taxonomy structure that helps group related documents together to aid in navigation and searching for documents.

Content within a remote services system comprises software routines used by a plurality of software applications. The remote services system is a framework that allows individual software applications to locate shared routines used by a plurality of software applications. The shared routines can be a routine, library, function, an application, or any other remotely invoked service. A software routine that may be used by many software applications is registered in a directory along with information describing its function and its interface. When an individual software application is running and requires a particular service (i.e., provided by the software routine), the remote services system it can look up the requested service in the directory and call the software routine that provides the requested service.

Content within a shared source system comprises documents that can be collaborated upon by a plurality individuals such as software code, designs, processes, etc. The shared source system may group content together (e.g. software code grouped together within a software development project). For example, the shared source system may group source code files (such as C++ or Java files, headers, etc.) together as related by projects. Software developers may then extract, modify, and replace source files as part of that project.

The content flow management tools 19a . . . 19d are used for controlling content flow within and between each of the content management systems 12a . . . 12d. The content association tools 17a . . . 17d are used for linking together and providing associations (e.g., metadata) for the content within the content management systems 12a . . . 12d. The associations (e.g., metadata) allow associated content from the content management systems 12a . . . 12d to be linked together so that a user may use the associations (e.g., metadata) to search for and locate the associated content. The associations (e.g., metadata) are linked together to provide a "web" of interconnected associated content stored across an organization. The associations (e.g., metadata) and provide a map to locate the associated content from the content management systems 12a . . . 12d.

The content manipulation tools 26a . . . 26d comprise the tools to allow teams within an organization to create, modify, and promote different types content within the content framework system 44. The access and security tools 30a . . . 30d comprise the tools to allow administrators of the content framework system 44 the ability to control parties (i.e., users) who may access or manipulate content within the content framework system 44. The community tools 28a . . . 28d comprise the tools to allow different teams within an organization collaborate and add value to the content within the content framework system 44. The joint development tools 24a . . . 24d comprise the tools to allow different teams within the organization to leverage knowledge and technology regarding the content within the content framework system 44. The content manipulation tools 26a . . . 26d, joint development tools 24a . . . 24d, access and security tools 30a . . . 30d, and community tools 28a . . . 28d in combination allow multiple teams to contribute to a technology (i.e., content within the content framework system 44).

Figure 2:
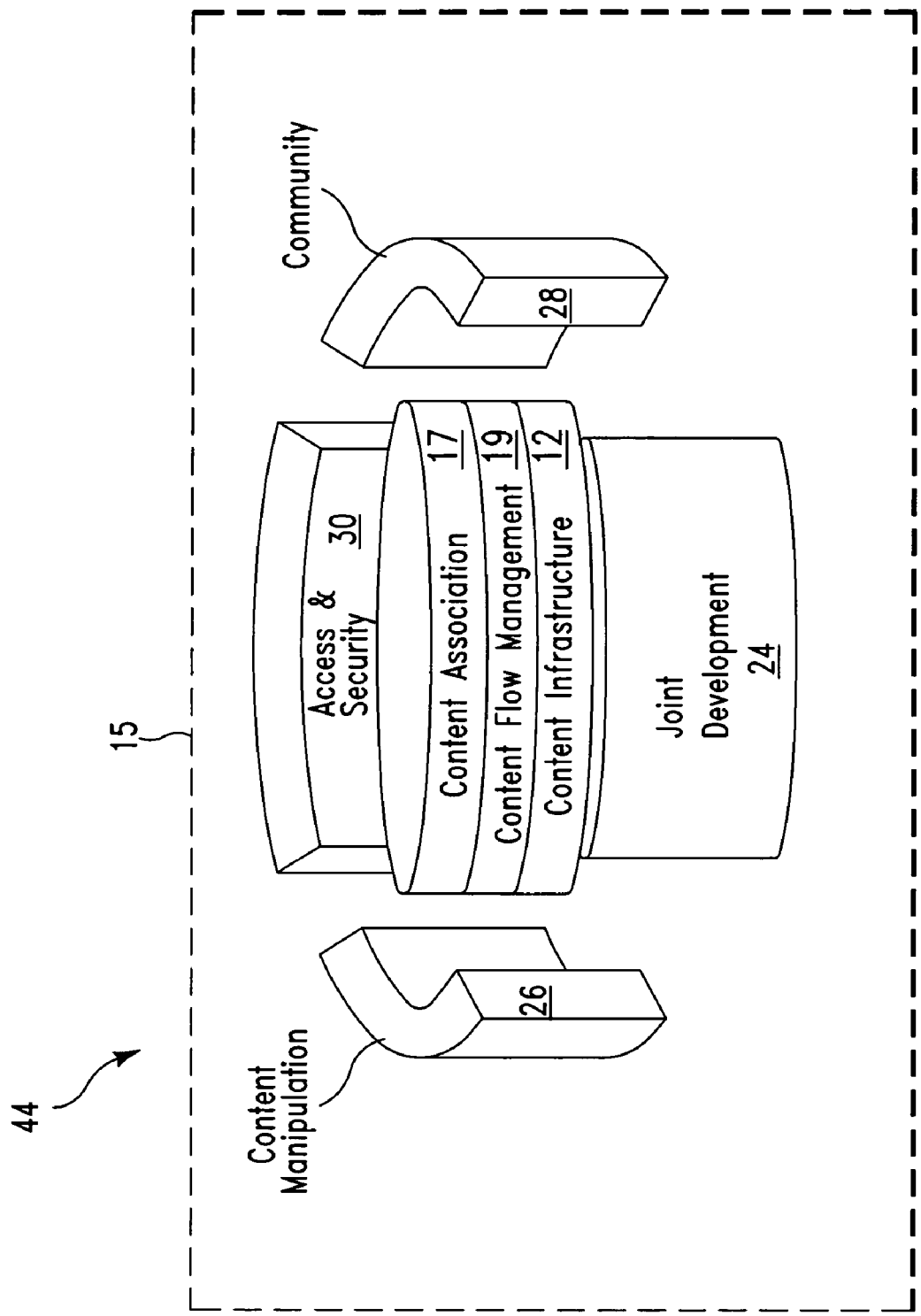
FIG. 2 illustrates an infrastructure view of the content framework system of FIG. 1, in accordance with embodiments of the present invention.

FIG. 2 illustrates an infrastructure view of content framework system 44 of FIG. 1, in accordance with embodiments of the present invention. In contrast with FIG. 1, FIG. 2 illustrates the server/databases 15a . . . 15d, the content management systems 12a . . . 12d, the content flow management tools 19a . . . 19d, the content association tools 17a . . . 17d, the content manipulation tools 26a . . . 26d, the joint development tools 24a ... 24d, the community tools 28a ... 28d, and the access and security tools 30a ... 30d from FIG. 1 as infrastructure layers in FIG. 2. The server/database 15 infrastructure comprises the server/databases 15a ... 15d. The content infrastructure 12 comprises the content management systems 12a ... 12d. The content flow management tool infrastructure 19 comprises content flow management tools 19a ... 19d. The content association tool infrastructure 17 comprises content association tools 17a ... 17d. The content manipulation tool infrastructure 26 comprises the content manipulation tools 26a ... 26d. The joint development tool infrastructure 24 comprises the joint development tools 24a ... 24d. The community tool 28 infrastructure comprises community tools 28a ... 28d. The security tool 30a ... 30d infrastructure comprises the security tools 30a ... 30d.

Figure 3:
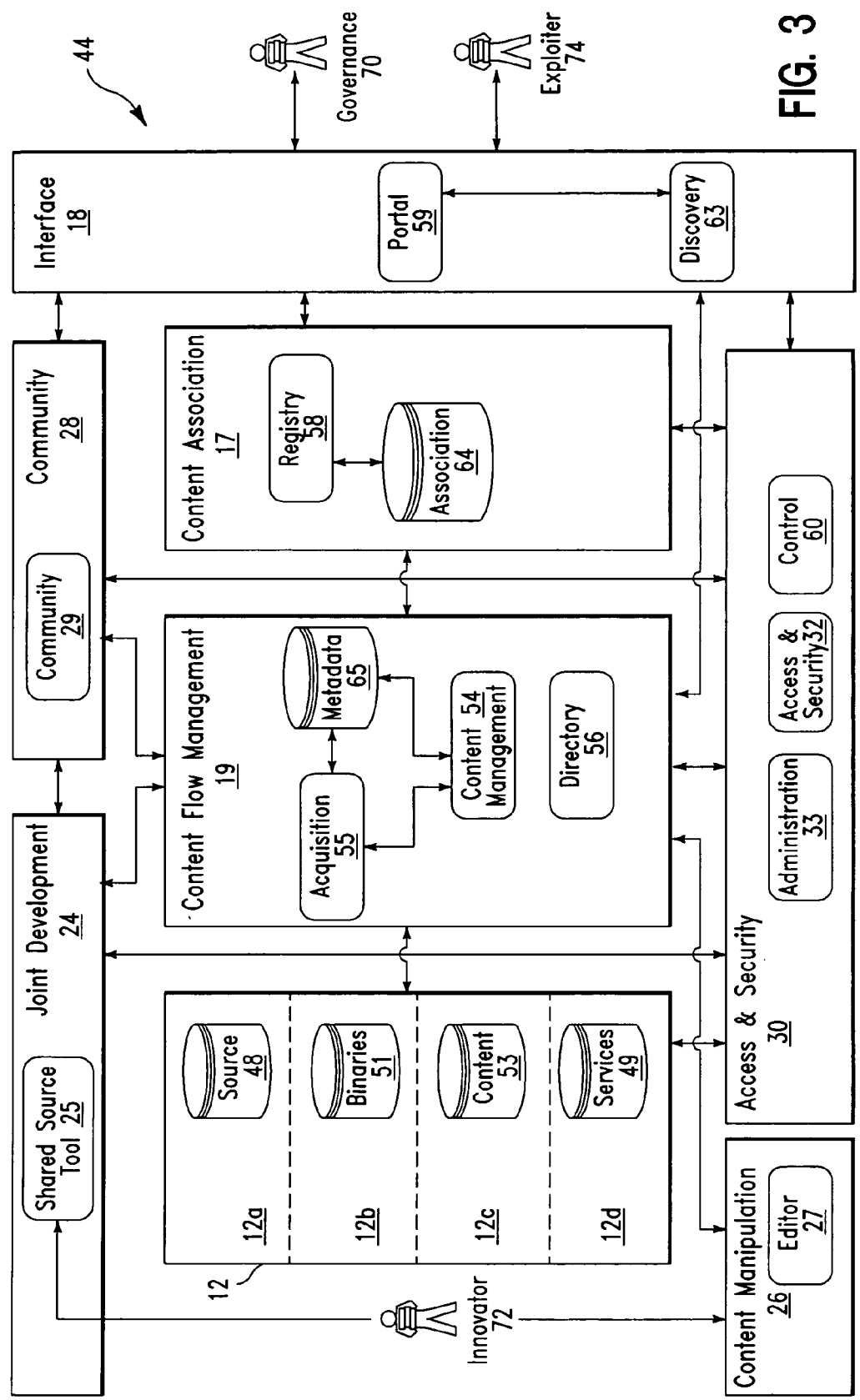
FIG. 3 illustrates a block diagram view of internal components within the content framework system of FIGS. 1 and 2, in accordance with embodiments of the present invention.

FIG. 3 illustrates a block diagram view of internal components within the content framework system 44 of FIGS. 1 and 2, in accordance with embodiments of the present invention. For illustration purposes, the content management systems 12a ... 12d within the content infrastructure 12 have been labeled as: a shared source system 12a, a distribution system 12b, a management system 12c, and a remote services system 12d. The shared source system 12a comprises source database 48. The joint development infrastructure comprises a shared source tool 25. The shared source tool 25 is used to create and modify content (e.g. software, hardware design, architectural designs, process flows, source code, etc.) that may be collaborated upon by multiple people. The group of multiple people collaborating on the content within the source database 48 is managed by the community infrastructure 28 comprising a community tool 29 that provides access to the shared source tool 25. An example of such a tool is Eclipse software used in conjunction with a Source Forge database to collaborate on software development. Source code (example of content) comprises source files that make up a project (e.g., a software program). The source files are stored in the source database 48 within the shared source system 12a. The source database 48 may have a higher level interface to save and access content, such as a database client or a web interface. In this case an instance of the acquisition tool 55 within the content flow management infrastructure 19 provides the interface from the shared source tool 25 into the source database 48. The shared source tool 25 is used to locate, access, and manipulate the source files in the source database 48. Additionally, the joint development infrastructure 24 comprising the shared source tool 25 are used to develop and test applications in the case of software development. Security and access controls on the content stored within the source database 48 by the shared source tool 25 is provided by the access and security infrastructure 30. The access and security infrastructure 30 defines who may create, modify, or delete content within the database 48. Additionally, the access and security infrastructure 30 defines who may use the shared source tool 24. The distribution system 12b comprises a binaries database 51 (e.g., a database or a file system) for storing executable or installable files (e.g., content used for distribution of product to customers and defined as binaries). Binaries in the binaries database 51 are acquired through an instance of acquisition tool 55. The instance of the acquisition tool 55 is not the same as the instance of the acquisition tool 55 used to acquire source code for the shared source system 12a. Metadata about the binaries (e.g. the name and version of the product) stored in the binaries database 51 are collected through the acquisition tool 55 and stored in the metadata database 65. Access to the binaries database 51 and the acquisition tool 55 (e.g., who may submit, update, or delete content) is controlled by the access and security infrastructure 30. The management system 12c comprises a content database 53 for storing content comprising data. For example, the content may comprise, inter alia, data comprising an HTML object, an XML object, a SGML object, a word processing object, a JPG object, a PDF object, any electronically viewable or manipulatable object, etc. The content database 53 may comprise, inter alia, a relational database, an object database, a file system, any mechanism used to store electronic documents on a system for later retrieval and/or access, etc. Content in the content database 53 are acquired through an instance of the acquisition tool 55 within the content flow management 19 infrastructure. This instance of acquisition tool 55 is not the same as the instance of the acquisition tool 55 used to acquire source code for the shared source system 12a or the binaries in the distribution system 12b. The remote services system 12d comprises a services database 49 for storing shared routines used by a plurality of software applications. A software routine that may be used by many software applications is registered in a directory 56 along with information describing its function and its interface. Remote services stored in the services database 49 are acquired through an instance of acquisition tool 55. Information about the remote services is passed from the acquisition tool 55 to a directory 56. This instance of the acquisition tool 55 is not the same as the instance of the acquisition tool 55 used to acquire source code for the shared source system 12a, binaries in the distribution system 12b, or data in the management system 12c.

The content flow management infrastructure 19 infrastructure comprises a metadata database 65, an acquisition tool 55, a content management tool 54, and a directory 56. The content flow management infrastructure 19 is used to provide high level access to content stored in the content infrastructure 12 by other systems. The content flow management infrastructure 19 may be used to submit content into or extract content out of the content infrastructure 12, or to access the content in the content infrastructure 12. The content flow management infrastructure 19 provides access to content in the content infrastructure 12 through the interface infrastructure 18, community infrastructure 28, joint development infrastructure 24, content association infrastructure 17, and in data manipulation infrastructure 26. The acquisition tool 55 is for allowing users/developers (e.g., teams within an organization) to interact with the content framework system 44 in order to submit a program/component/library to a project for storage. Multiple instances of the acquisition tool 55 may exist for the different types of content being stored or accessed in the content infrastructure 12. The metadata database 65 stores information about the program/component/library (e.g., type of operating system it runs on, a version, a date submitted, etc) elements stored in the content infrastructure 12. There may be multiple instances of the metadata database 65. The content management tool 54 provides a web or application interface to content within the content framework system 44.

The content association tool infrastructure 17 comprises a registry tool 58 and an association database 64. The registry tool 58 is for developing a registry comprising the associations (e.g., metadata) that connect content across the different systems (i.e., the shared source system 12a, the distribution system 12b, the management system 12c, and the remote services system 12d). The registry tool 58 links and provides associations for the information (i.e., content within content management system 12a ... 12d) so that the individual teams within the organization may locate associated content within the content management systems 12a ... 12d to collaborate with each other and provide solutions to problems existing within the content. The association database 64 is for storing the registry comprising the associations (e.g., metadata). The content flow management infrastructure 19 cannot associate content across the content management systems 12a . . . 12d because the systems exist in separate instances of the components (i.e., acquisition tool 54, content management tool 55, and metadata database 65) and do not have the same content structures. The associations stored in the associations infrastructure 17 reflect the entities of the content stored in each content management system (12a . . . 12d) and do not reflect a structure of the content in the content management system 12a . . . 12d existing in the content infrastructure 12 or the instances of the metadata database 65. Content that is created and input through content flow management infrastructure 19 into content infrastructure 12 comprises association information (metadata) that is created and used by the registry tool 58. The association information may be created dynamically each time content is accessed in the content infrastructure 12 or it may be stored in the association database 64. The registry also contains metadata mappings across the different content managements systems 12a . . . 12d to bridge across the systems.

Users of the content framework system 44 are comprised of innovators 72, exploiters 74, and governance 70. An innovator 72 is a user who creates new content or contributes to existing content within the content framework system 44. An innovator 72 is a creator of content. An exploiter 74 is a user who is looking for content within the content framework system 44, but does not contribute content. An exploiter 74 is a consumer of content. A governance 70 is a user that controls the components within the content framework system 44. The governance 70 controls access and security to the content within the content framework system 44. A user may be any of the three types and may move between the types. For example, an exploiter 74 who finds a technology (content) that they are interested in may become an innovator 72 if they start to contribute content to the content framework system 44. An innovator 72 might become a governance 70 if they set controls on the content they create.

The interface infrastructure 18 provides exploiters 74 and governance 70 access to the content stored in the content infrastructure 12. This access is gained either through the content association infrastructure 17 or the content flow management infrastructure 19. If a user (exploiters 74 or governance 70) is accessing the content flow management 19 directly from the interface 18, then only the individual content management systems 12a . . . 12d may be accessed independently. If a user (exploiters 74 or governance 70) is accessing the content flow management 19 through the content association 17, then all content within the content infrastructure 12 is accessible as a result of the associations and mappings in the registry. The interface infrastructure 18 comprises a portal 59 (e.g. a web application or any other interface that may be used by a user of the content framework system 44 to locate and view content within the content management systems 12a . . . 12d) and a discovery component 63. The discovery component 63 is used to perform searches across the content flow management infrastructure 19 or the content association infrastructure 17.

The access and security infrastructure 30 is used to control access to process and content in content management systems 12a . . . 12d, infrastructures 12, 17, 18, and 19, joint development 24, and community 28. The access and security infrastructure 30 comprises an administration tool 33, an access and security tool 32, and a control tool 60. There may exist multiple instances of any of these components. The control tool 60 is used by a governance party 70 (e.g., an administrator) to control specific parties (e.g., teams comprising exploiters 74, innovators 72, etc.) that may access or manipulate content and associations within the content framework system 44. The access and security tool 32 comprises the tools to allow administrators (e.g., governance 70) of the content framework system 44 the ability to control parties (i.e., users) who may access or manipulate content within the content framework system 44.

The content manipulation infrastructure 26 comprises the tools to allow teams within an organization to create, modify, and promote different types content within the content framework system 44. The content manipulation infrastructure 26 comprises an editor that may be used by an innovator 72 to create or manipulate content used in content flow management infrastructure 19 or shared source tool 25 in the joint development infrastructure 24. The content created by the editor 27 is used in the content management systems 12a . . . 12d. The community infrastructure 28 comprises the tools (community tool 29) to allow different teams within an organization collaborate and add value to the content within the content framework system 44. The joint development infrastructure 24 comprises the tools (shared source tool 25) to allow different teams within the organization to leverage knowledge and technology regarding the content within the content framework system 44. An innovator 72 comprises a party (e.g., a technical team) creating content within the content framework system 44. An exploiter 74 comprises a party (e.g., a technical team) modifying the content within the content framework system 44.

An example of usage for the content framework system 44 of FIGS. 1-3 is described as follows. An innovator 72a invents a new technology to be used. The innovator 72a creates a patent disclosure and software application for the new technology and submits them into an intellectual property system that is comprised by the content flow management infrastructure 19 through an instance of an acquisition tool 55. The patent disclosure stored in the content database 53 in the content infrastructure 12 describes the key invention points and how it is unique from prior art. The innovator 72a, if they have not done so already, starts a project to develop the technology and creates a database table to store project documents (design docs, requirements docs, etc.) in another instance of the content database 53 through another instance of the acquisition tool 55. This step also happens between the content flow management 19 and the content infrastructure 12. A team is then put together that is managed through joint development infrastructure 24 and controlled by access and security infrastructure 30. If the technology is implemented as a software application, code is developed using the editor 27 in the content manipulation 26 infrastructure and stored in the source database 48 so that a team of developers can access and contribute to the code. Access to who is allowed to create and/or modify the code is controlled by the access and security infrastructure 30.

As the project is completed, content is created about the software application (e.g., marketing materials, online manuals and help files, pricing, etc.) that is managed in yet another instance of content management system 12c. These documents are made available through a network, Intranet, Internet, or other communication system for users to view. The developed product is packaged as an installable application, along with documentation on how to use, install, etc., and sent to the distribution system 12b that will ship physical copies of the applications to customers, or make an electronic version available for download by customers from the Internet or Intranet.

Another innovator 72b is now looking to start a new project and is looking for the technology that was created by the innovator 72a above (without any knowledge that the first innovator exists). A search of the company's Intranet from the interface 18 into a content flow management infrastructure 19 from an interface 18 using a discovery 63 direct to the content flow management 19 might result in finding a description of the first innovator's 72a product. The second innovator 72b would then need to track down the first innovator and other people with knowledge about the project, project documentation, and source code or libraries to determine if that technology is usable in the second innovator's project. All of the needed information may not be part of the content that was discovered in the original search for the technology. Without the invention, the new innovator would have to find and search through all of the content management systems 12a . . . 12d and all instances within them to locate technologies that could be exploited. The source code would be in one system, general information in another, project descriptions and people with knowledge in another, the usable programs in yet another, and IP in a final system. Each of these separate systems may exist in many separate instances in large organizations or organizations that are partnering together. It is very time consuming to look for available technologies within an organization and as a result, many groups reinvent the same idea over and over again. In the present invention, when the first innovator 72a creates content in each of the different systems 12a . . . 12d, meta-information about each document is collected by agents and stored in a registry in the content association infrastructure 17. The meta-information contains the name of the author, the type of doc (source code, design doc, description, etc.), short description, and other information that describes the content at a high level. The registry tool 58 may look across documents and based on the relationship between meta-information, infer that documents are related and make a connection. This connection can occur dynamically or can be stored in the association database 64. When the second innovator 72b is looking for a technology, a search resulting in any of the documents created by the first innovator 72a would automatically show the connections to the other documents. This way the second innovator 72b can follow the connection trail to find all material related to the technology being investigated.

The second innovator 72b could then put a team of developers together to further develop the first innovator's 72a technology to be used in a new product. Both teams of developers could co-work together through the community 28 and the joint development tools 24 on the base technology and feed more information into the framework 44. Parts of the system, such as source code and design docs, would be shared and provide a more efficient way to develop and deploy products, The steps for the $2^{nd}$ innovator's team would be the same as the first's, but with a couple of common, shared points.

Any exploiter 74 (e.g., 74a or 74b) using the invention could look at an organization's knowledge (content) and be able to locate and assign value to available intellectual capital. By looking at the connections to and from a discovered document, an exploited can see who is using an idea, what has been developed, and how many things have been deployed based on an idea or a set of ideas.

Figure 4:
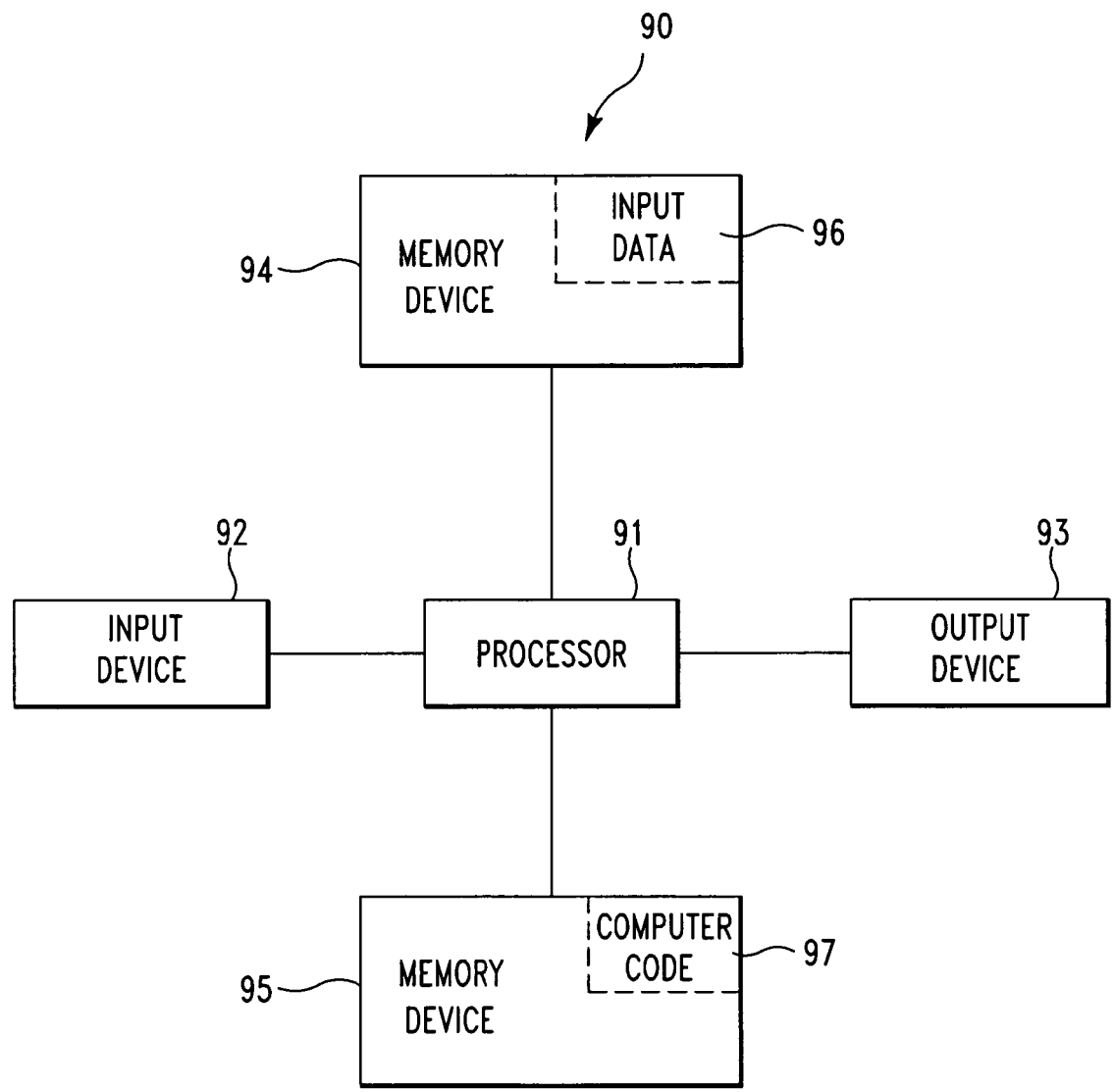
FIG. 4 illustrates a computer system used for linking together and providing associations for content within a content framework system, in accordance with embodiments of the present invention.

FIG. 4 illustrates a computer system 90 used for linking together and providing associations for content within a content framework system, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm for linking together and providing associations for content within a content framework system. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 9) may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Thus the present invention discloses a process for deploying or integrating computing infrastructure, comprising integrating computer-readable code into the computer system 90, wherein the code in combination with the computer system 90 is capable of performing a method used for linking together and providing associations for content within a content framework system.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:
1. A method, comprising:
providing a content framework system comprising a content infrastructure, a content flow management system, a content association system, a content manipulation system, a user interface, and a control interface, wherein the content infrastructure comprises content management systems, wherein each of said content management systems comprises content, wherein said content manipulation system comprises an editor, and wherein said content flow management system comprises an agent tool;
controlling by said content flow management system, a flow of each of said content from each of said content management systems within said content infrastructure system, wherein said flow is controlled within and between each of said content management systems;
interfacing, by said content flow management system, said content flow management system to said content infrastructure;

generating, by said content association system, a first set of associations metadata comprising a first set of links for linking said content management systems together;

monitoring by said agent tool, said content from each of said content management systems;

adding to a registry by said agent tool, a description of said content from each of said content management systems based on said monitoring;

adding to said registry by said agent tool, a first description of a first portion of said content from a first content management system of said content management systems and a second description of a second portion of said content from a second content management system of said content management systems based on said monitoring;

linking by said first set of links, said first portion of said content with said second portion of said content;

enabling, by said editor, a user to generate or modify said said content;

interfacing by said user interface, said user to said associations metadata for said cross referencing; and interfacing by said control interface, an administrator to said registry for generating said associations metadata.

2. The method of claim 1, wherein a first content management system of said content management systems comprises a distribution system, wherein said content of said first content management system comprises software applications, and wherein said method further comprises:

storing and distributing by said distribution system said content of said first content management system.

3. The method of claim 1, wherein a first content management system of said content management systems comprises a management system, wherein said content of said first content management system comprises data, and wherein said method further comprises:

creating and controlling by said management system, said content of said first content management system.

4. The method of claim 1, wherein a first content management system of said content management systems comprises a remote services system, wherein content of said first content management system comprises shared software routines used by a plurality of software applications, and wherein said method further comprises:

locating by said remote services system, said content of said first content management system.

5. The method of claim 1, wherein a first content management system of said content management systems comprises an shared source development system, wherein said content of said first content management system comprises software code developed by a plurality of users, and wherein said method further comprises:

defining and modifying by said open source development system, said content of said first content management system.

6. The method of claim 1, wherein said content framework system further comprises a security system, and wherein said method further comprises:

restricting by said security system, access to said content from each of said content management systems.

* * * * *